US012567412B1

(12) United States Patent
Swerdlow

(10) Patent No.: US 12,567,412 B1
(45) Date of Patent: Mar. 3, 2026

(54) CONNECTION STRENGTH-BASED NAME DETECTION AND ATTRIBUTION IN CONFERENCES

(71) Applicant: Zoom Communications, Inc., San Jose, CA (US)

(72) Inventor: Aleksandra Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 343 days.

(21) Appl. No.: 18/306,628

(22) Filed: Apr. 25, 2023

(51) Int. Cl.
| | |
|---|---|
| *G10L 15/22* | (2006.01) |
| *G06F 40/134* | (2020.01) |
| *G10L 15/08* | (2006.01) |
| *G10L 15/30* | (2013.01) |

(52) U.S. Cl.
CPC ............ *G10L 15/22* (2013.01); *G06F 40/134* (2020.01); *G10L 15/08* (2013.01); *G10L 15/30* (2013.01); *G10L 2015/088* (2013.01)

(58) Field of Classification Search
USPC ................ 704/235, 246, 247, 251, 252, 275
See application file for complete search history.

(56) References Cited

U.S. PATENT DOCUMENTS

| | | |
|---|---|---|
| 8,370,142 B2 | 2/2013 | Frankel et al. |
| 8,484,040 B2 | 7/2013 | Ashour et al. |
| 8,515,025 B1 | 8/2013 | Hewinson |
| 8,649,494 B2 | 2/2014 | Basson et al. |
| 10,867,610 B2 | 12/2020 | Diamant et al. |
| 11,315,569 B1* | 4/2022 | Talieh ................. H04L 12/1831 |
| 2013/0294594 A1* | 11/2013 | Chervets ................. H04M 3/56 |
| | | 379/202.01 |
| 2014/0152757 A1* | 6/2014 | Malegaonkar ........ H04L 67/535 |
| | | 348/14.01 |
| 2014/0164501 A1* | 6/2014 | Herger .................. H04M 3/567 |
| | | 709/204 |
| 2024/0305678 A1* | 9/2024 | Llamas Virgen ... H04L 65/1089 |

* cited by examiner

*Primary Examiner* — Leonard Saint-Cyr
(74) *Attorney, Agent, or Firm* — Young Basile Hanlon & MacFarlane, P.C.

(57) ABSTRACT

A conference system detects a name of a person in a discussion between two or more participants in a conference. The name is detected in an audio component of the conference. The conference system determines a list of person candidates associated with the name based on scores determined for individual persons in a contact list relative to the name. The conference system determines a connection strength score between the conference participant that spoke the name and a person in the list of person candidates. The conference system determines that the person is an intended person based on the connection strength score and generates a transcript that includes the name of the intended person.

20 Claims, 8 Drawing Sheets

700

702

DETERMINE WHETHER CONNECTION STRENGTH SCORE MEETS THRESHOLD

704

ADD PERSON TO SECOND LIST OF PERSON CANDIDATES

706

SELECT CANDIDATE NAME WITH HIGHEST CONNECTION STRENGTH SCORE

708

GENERATE TRANSCRIPT

800

802

DETERMINE RESPECTIVE CONNECTION STRENGTH SCORE FOR EACH PERSON

804

DETERMINE CONTEXT OF THE TEXT DATA

806

DETERMINE INTENDED PERSON

CONNECTION STRENGTH-BASED NAME DETECTION AND ATTRIBUTION IN CONFERENCES

FIELD

This disclosure generally relates to name detection and attribution in conferences.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
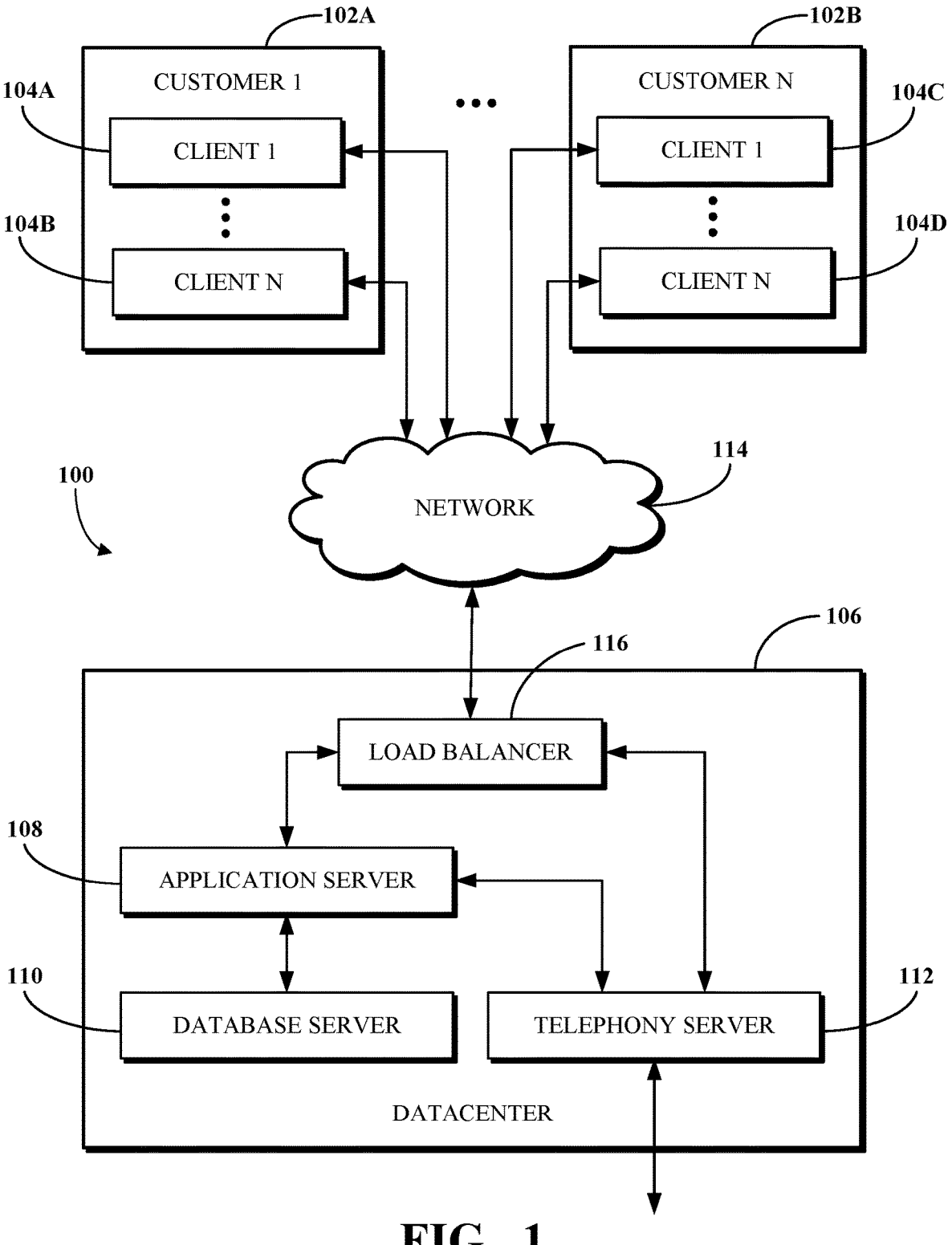
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

A software platform, such as a UCaaS platform, may facilitate a conference between multiple participants. During such a conference, a participant may mention a name of another participant of the conference, or of another user of an organizational account associated with the conference, for example, to call that other participant's attention to an item under discussion or to reference that other user in discussion. In many cases, the name is mispronounced, a nickname is used instead of a proper name, or there may be multiple users on the account with the same (or similar) name. This can lead to transcription errors, such as the name being misspelled or misrepresented or the wrong name being inserted into the transcript of the conference, so that when a participant or another user is reviewing the transcript of the conference, they are not able to accurately identify the person to whom the speaker was referring. Conventional conference systems do not have the ability to detect names, or variants thereof (e.g., nicknames or mispronounced names), and attribute a name to a person to whom the speaker was referring.

Implementations of this disclosure address problems such as these by providing a conference system that detects when a name is spoken during the conference using an ASR process and attributes the name to the person to whom the speaker was referring (i.e., the intended person). The implementations may require authorization of an account administrator prior to use. The conference system determines the intended person based on a connection strength score between the person and the speaker. The connection strength score is based on a number of interactions between the conference participant that spoke the name and the person whom the conference participant spoke of (i.e., the intended person). The connection strength score increases as the number of interactions increases. In some examples, the connection strength score may be based on a recency score of one or more interactions between the conference participant that spoke the name and the person whom the conference participant spoke of. The connection strength score increases relative to the recency score as the temporal recency of an interaction increases. In some examples, the connection strength score may be based on a number of common interactions of the conference participant that spoke the name and the person whom the conference participant spoke of. A common interaction may be based on an interaction of the conference participant that spoke the name and an interaction of the person whom the conference participant spoke of with a document or a common application, such as a chat room or a whiteboard. The common interaction may be weighted. For example, a common interaction based on collaboration of the conference participant that spoke the name and the person whom the conference participant spoke of on a document with 3 other persons will have a lower weight than a common interaction based on collaboration of the conference participant that spoke the name and the person whom the conference participant spoke of on a whiteboard with 10 other persons.

In some examples, the system determines the intended person by processing a real-time transcription of the conference using a machine learning (ML) model trained for contextual awareness. In some examples, the ML model may be trained using a data set of speech data from previous instances of users speaking in a conference. The speech data may include metadata associated with speech patterns. The ML model may be used to determine the intended person by keyword processing of the audio stream for references of one or more subjects associated with the name within some context. The system identifies the participant (e.g., the speaker) who spoke the name, for example using metadata in the audio signals from the participant device.

To describe some implementations in greater detail, reference is first made to examples of hardware and software structures used to implement connection strength-based name detection and attribution in conferences. FIG. 1 is a block diagram of an example of an electronic computing and communications system 100, which can be or include a distributed computing system (e.g., a client-server comput-
ing system), a cloud computing system, a clustered com-
puting system, or the like.

The system 100 includes one or more customers, such as
customers 102A through 102B, which may each be a public
entity, private entity, or another corporate entity or indi-
vidual that purchases or otherwise uses software services,
such as of a UCaaS platform provider. Each customer can
include one or more clients. For example, as shown and
without limitation, the customer 102A can include clients
104A through 104B, and the customer 102B can include
clients 104C through 104D. A customer can include a
customer network or domain. For example, and without
limitation, the clients 104A through 104B can be associated
or communicate with a customer network or domain for the
customer 102A and the clients 104C through 104D can be
associated or communicate with a customer network or
domain for the customer 102B.

A client, such as one of the clients 104A through 104D,
may be or otherwise refer to one or both of a client device
or a client application. Where a client is or refers to a client
device, the client can comprise a computing system, which
can include one or more computing devices, such as a
mobile phone, a tablet computer, a laptop computer, a
notebook computer, a desktop computer, or another suitable
computing device or combination of computing devices.
Where a client instead is or refers to a client application, the
client can be an instance of software running on a customer
device (e.g., a client device or another device). In some
implementations, a client can be implemented as a single
physical unit or as a combination of physical units. In some
implementations, a single physical unit can include multiple
clients.

The system 100 can include a number of customers and/or
clients or can have a configuration of customers or clients
different from that generally illustrated in FIG. 1. For
example, and without limitation, the system 100 can include
hundreds or thousands of customers, and at least some of the
customers can include or be associated with a number of
clients.

The system 100 includes a datacenter 106, which may
include one or more servers. The datacenter 106 can repre-
sent a geographic location, which can include a facility,
where the one or more servers are located. The system 100
can include a number of datacenters and servers or can
include a configuration of datacenters and servers different
from that generally illustrated in FIG. 1. For example, and
without limitation, the system 100 can include tens of
datacenters, and at least some of the datacenters can include
hundreds or another suitable number of servers. In some
implementations, the datacenter 106 can be associated or
communicate with one or more datacenter networks or
domains, which can include domains other than the cus-
tomer domains for the customers 102A through 102B.

The datacenter 106 includes servers used for implement-
ing software services of a UCaaS platform. The datacenter
106 as generally illustrated includes an application server
108, a database server 110, and a telephony server 112. The
servers 108 through 112 can each be a computing system,
which can include one or more computing devices, such as
a desktop computer, a server computer, or another computer
capable of operating as a server, or a combination thereof. A
suitable number of each of the servers 108 through 112 can
be implemented at the datacenter 106. The UCaaS platform
uses a multi-tenant architecture in which installations or
instantiations of the servers 108 through 112 is shared
amongst the customers 102A through 102B.

In some implementations, one or more of the servers 108
through 112 can be a non-hardware server implemented on
a physical device, such as a hardware server. In some
implementations, a combination of two or more of the
application server 108, the database server 110, and the
telephony server 112 can be implemented as a single hard-
ware server or as a single non-hardware server implemented
on a single hardware server. In some implementations, the
datacenter 106 can include servers other than or in addition
to the servers 108 through 112, for example, a media server,
a proxy server, or a web server.

The application server 108 runs web-based software ser-
vices deliverable to a client, such as one of the clients 104A
through 104D. As described above, the software services
may be of a UCaaS platform. For example, the application
server 108 can implement all or a portion of a UCaaS
platform, including conferencing software, messaging soft-
ware, and/or other intra-party or inter-party communications
software. The application server 108 may, for example, be or
include a unitary Java Virtual Machine (JVM).

In some implementations, the application server 108 can
include an application node, which can be a process
executed on the application server 108. For example, and
without limitation, the application node can be executed in
order to deliver software services to a client, such as one of
the clients 104A through 104D, as part of a software
application. The application node can be implemented using
processing threads, virtual machine instantiations, or other
computing features of the application server 108. In some
such implementations, the application server 108 can
include a suitable number of application nodes, depending
upon a system load or other characteristics associated with
the application server 108. For example, and without limi-
tation, the application server 108 can include two or more
nodes forming a node cluster. In some such implementa-
tions, the application nodes implemented on a single appli-
cation server 108 can run on different hardware servers.

The database server 110 stores, manages, or otherwise
provides data for delivering software services of the appli-
cation server 108 to a client, such as one of the clients 104A
through 104D. In particular, the database server 110 may
implement one or more databases, tables, or other informa-
tion sources suitable for use with a software application
implemented using the application server 108. The database
server 110 may include a data storage unit accessible by
software executed on the application server 108. A database
implemented by the database server 110 may be a relational
database management system (RDBMS), an object data-
base, an XML database, a configuration management data-
base (CMDB), a management information base (MIB), one
or more flat files, other suitable non-transient storage mecha-
nisms, or a combination thereof. The system 100 can include
one or more database servers, in which each database server
can include one, two, three, or another suitable number of
databases configured as or comprising a suitable database
type or combination thereof.

In some implementations, one or more databases, tables,
other suitable information sources, or portions or combina-
tions thereof may be stored, managed, or otherwise provided
by one or more of the elements of the system 100 other than
the database server 110, for example, the client 104 or the
application server 108.

The telephony server 112 enables network-based tele-
phony and web communications from and to clients of a
customer, such as the clients 104A through 104B for the
customer 102A or the clients 104C through 104D for the
customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
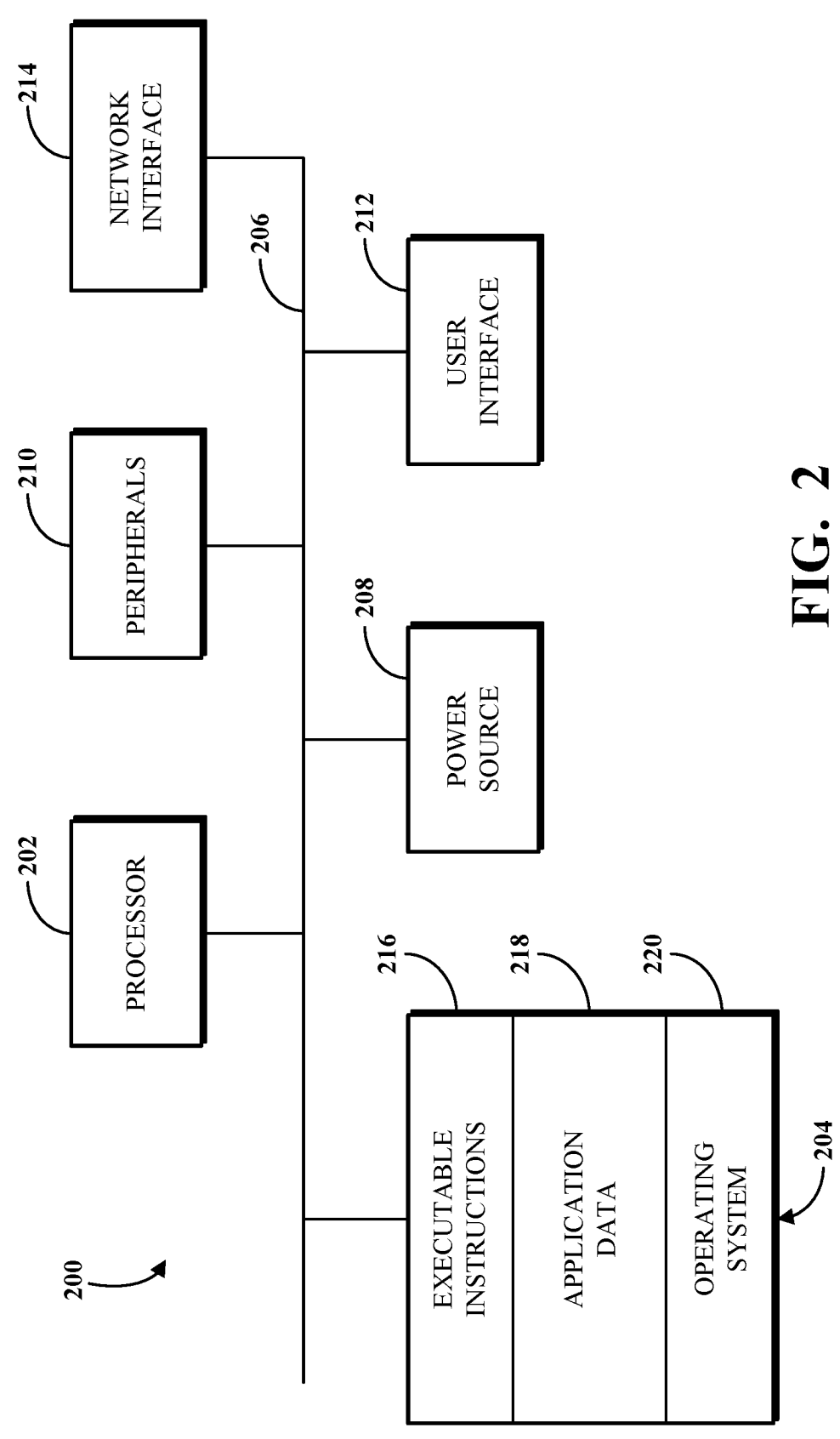
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
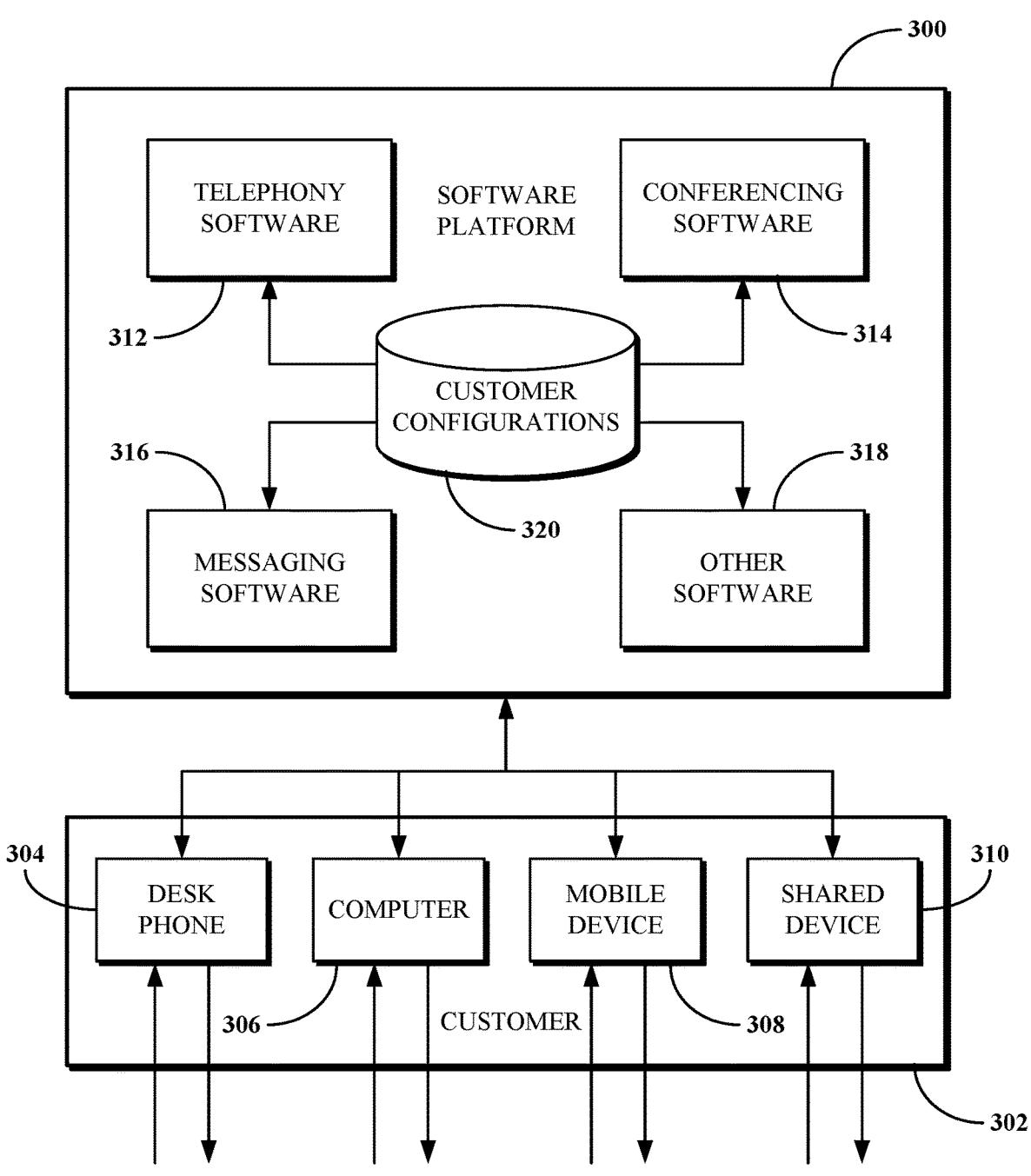
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can perform name detection and attribution in conferences. In at least some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
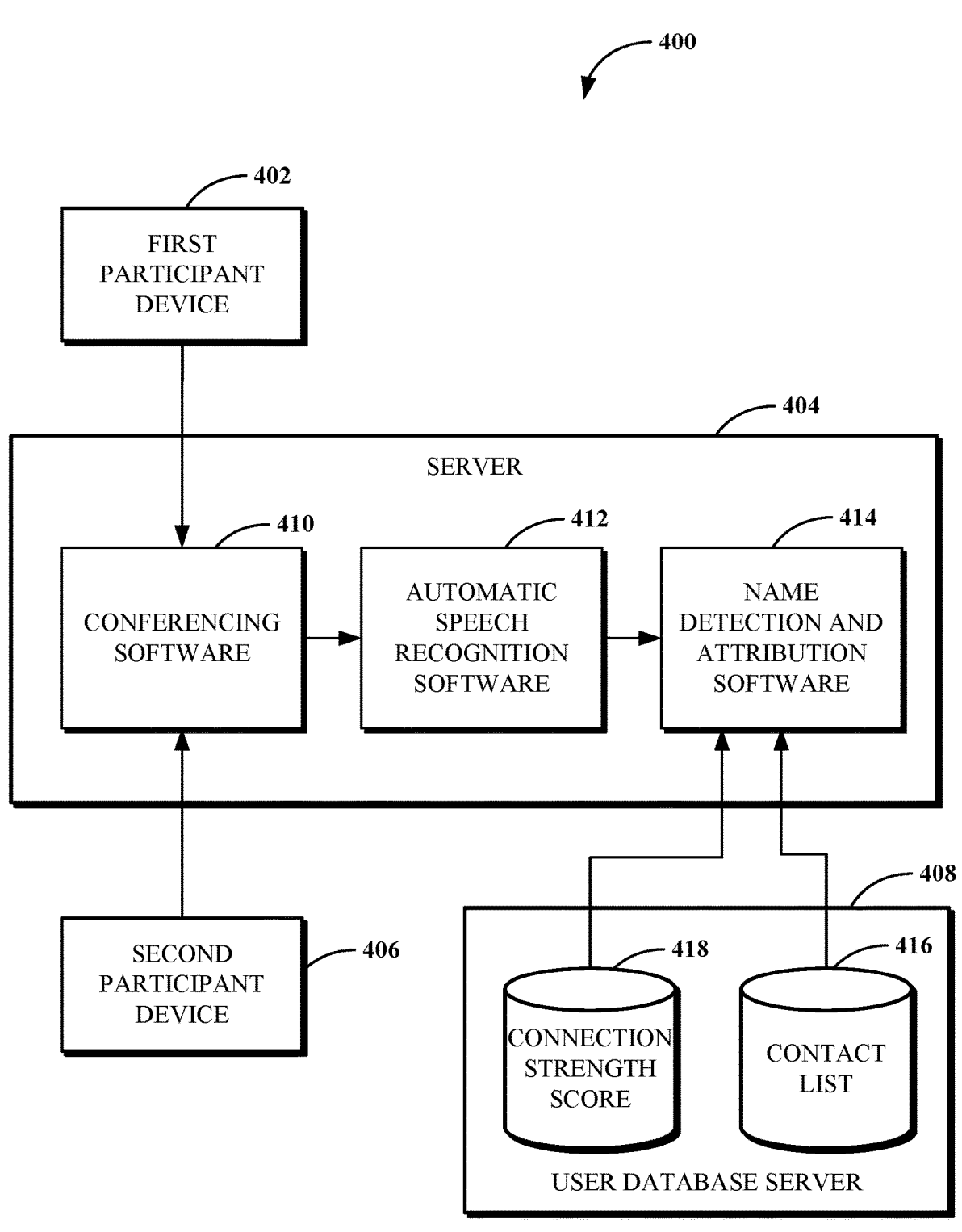
FIG. 4 is a block diagram of an example of a system for name detection and attribution using automated speech recognition (ASR).

FIG. 4 is a block diagram of an example of a system 400 for name detection and attribution using ASR. The system 400 includes a first participant device 402, a server 404, a second participant device 406, and a user database server 408. The first participant device 402 and the second participant device 406 may each be one of the clients 304 to 310 shown in FIG. 3; however, the first participant device 402 and the second participant device 406 do not need to be client devices. While two participant client devices are shown in this example for simplicity and clarity, in other cases, more than two participant client devices may be used with the system 400. The server 404 may be used to implement at least a portion of the software platform 300 shown in FIG. 3. For example, the server 404 may be used to implement conferencing functionality of the software platform 300. In an example, the name detection and attribution functionality may be implemented in the other software 318 shown in FIG. 3. The user database server 408 may include a database server, such as the database server 110 shown in FIG. 1. In some examples, the user database server 408 may be implemented as a component of the server 404.

The server 404 includes conferencing software 410, ASR software 412, and name detection and attribution software 414. The conferencing software 410 may, for example, be the conferencing software 314 shown in FIG. 3. The conferencing software 410 is configured to enable audio, video, and/or other forms of conferences between multiple participants, such as a user of the first participant device 402 and a user of the second participant device 406. In this example, there may be additional participants in the conference that are not shown in FIG. 4 for simplicity and clarity. The ASR software 412 is or otherwise uses a transcription engine that is configured to monitor an audio component of the conference, such as, for example, an audio channel used by the participant devices of the conference, including those participant devices not shown in FIG. 4, via the conferencing software 410. The audio signals from each participant device may include metadata that can be used to identify the participant. The metadata may include a participant account, a participant identification (ID), a caller ID associated with the participant device, or any other data that can be used to identify the participant.

The ASR software 412 is configured to monitor the audio signals from the conferencing software 410. The ASR software 412 may detect speech in the audio signals and convert the detected speech to text data to generate a real-time transcription of the conference. The ASR software 412 may perform speech detection, natural language processing, audio channel processing, software-based audio analysis and processing, another form of audio processing, or any combination thereof. In some cases, the ASR software 412 may use a preset buffer delay. The ASR software 412 is configured to transmit the text data to the name detection and attribution software 414. In some implementations, the ASR software 412 may be implemented other than at the server 404.

The name detection and attribution software 414 is configured to receive the text data and process the text data using an ML model trained for contextual awareness. For example, the ML model may detect a name by keyword processing that references one or more subjects associated with the name within some context. The one or more subjects may be based on an invitee list for the conference (e.g., persons that have been invited to the conference, but not necessarily have joined the conference), a participant list for the conference (e.g., persons that have joined the conference), a plan for the conference, learned from previous conference plans, or any combination thereof. In another example, the ML model may detect a phrase spoken by one or more participants suggesting that a person is assigned a task to be performed in the future or has performed some action in the past (e.g., "Jacob will send the report after the meeting" or "The coversheets for the reports were approved by Bill last week," and permutations of either). In the former case, the ML model may detect the name based on a determination of keywords within a neighboring word range of that phrase (e.g., within ten words preceding the phrase in the text data).

The name detection and attribution software 414 may perform a semantic analysis on the text data to determine permutations of a name in examples where the name may be mispronounced (e.g., "Alice" instead of "Alex"), a nickname is used instead of a proper name (e.g., "Mike" instead of "Michael"), or when there are multiple users on the account with the same (or similar) name (e.g., "Stephen Smith" and "Steven Smith"). The semantic analysis may be performed when a name detected in the text data does not match a name in a contact list database 416 of the user database server 408. The contact list database 416 includes persons associated with an organization or persons otherwise associated with a shared account.

When the name detected in the text data does not match a name in the contact list database 416, the name detection and attribution software 414 determines a list of person candidates associated with the detected name. The list of person candidates can be determined based on scores for individual persons in the contact list database 416 relative to the detected name. For example, the score for each individual person in the contact list database 416 may be determined using a probabilistic matching to determine a statistical probability that the detected name is associated with a person in the contact list database 416. The detected name may be stored and processed through ML algorithms for future use.

The name detection and attribution software 414 obtains, from a connection strength score database 418 of user database server 408, a connection strength score between the conference participant that spoke the name and a person in the list of person candidates. The connection strength score is based on a number of interactions between the conference participant that spoke the name and the person in the list of person candidates. The connection strength score increases as the number of interactions increases. In some examples, the connection strength score may be based on a recency score of one or more interactions between the conference participant that spoke the name and the person in the list of person candidates. The connection strength score increases relative to the recency score as the temporal recency of an interaction increases. In some examples, the connection strength score may be based on a number of common interactions of the conference participant that spoke the name and the person in the list of person candidates. A common interaction may be based on an interaction of the conference participant that spoke the name and an interaction of the person in the list of person candidates with a document or a common application, such as a chat room or a whiteboard. The common interaction may be weighted. For example, a common interaction based on collaboration of the conference participant that spoke the name and the person in the list of person candidates on a document with 3 other persons will have a lower weight than a common interaction based on collaboration of the conference participant that spoke the name and the person in the list of person candidates on a whiteboard with 10 other persons.

The name detection and attribution software 414 determines, based on the connection strength score, that the person is an intended person referred to by the conference participant. For example, the name detection and attribution software 414 may determine that the person is the intended person when the connection strength score is high or above a threshold. In some examples, the name detection and attribution software 414 may determine that the person is the intended person based on the connection strength score and the context of what was spoken. For example, the context may refer to a document that the conference participant that spoke the name and the person in the list of person candidates both collaborated on. If the connection strength score between the conference participant that spoke the name and the person in the list of person candidates is above a threshold, the name detection and attribution software 414 may use the context to determine that the person in the list of person candidates is the intended person. In some examples, the name detection and attribution software 414 may prompt the conference participant that spoke the name to confirm whether the intended person is correct. The confirmation response from the conference participant may be used to learn new names for use in performing future semantic analyses.

The name detection and attribution software 414 associates the name of the person in the list of person candidates in the text data of the conference with the intended person. In some examples, the name detection and attribution software 414 may embed a hyperlink to the name of the person in the transcript. The hyperlink may be associated with a profile card of the person associated with the name. The profile card may include an image of the person, contact information such as an email address and/or phone number, a title of the person within the organization, a department in which the person works, other information associated with the person, or any combination thereof.

Figure 5:
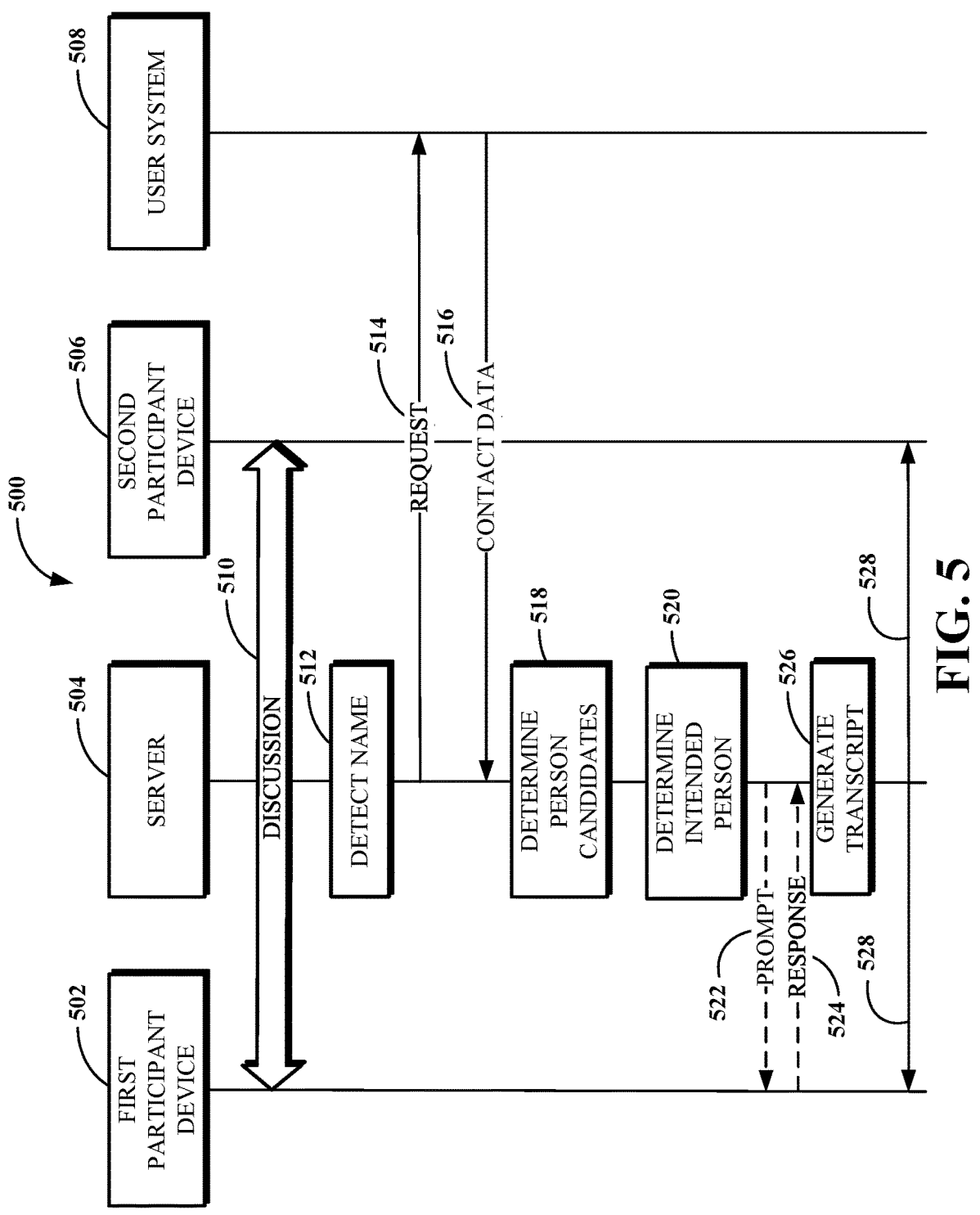
FIG. 5 is a swim lane diagram of an example of a system for name detection and attribution during a conference.

FIG. 5 is a swim lane diagram of an example of a system 500 for name detection and attribution during a conference. The system 500 includes a first participant device 502, a server 504, a second participant device 506, and a user system 508. The first participant device 502 and the second participant device 506 may each be any one of the devices 304 to 310 shown in FIG. 3. The server 504 may be the same as server 404 shown in FIG. 4, and may be used to implement the software platform 300 shown in FIG. 3. In an example, the name detection and attribution functionality may be implemented in the other software 318 shown in FIG. 3. The user system 508 may be a database server, such as database server 110 shown in FIG. 1. In some examples, the user system 508 may be implemented as a component of the server 504.

In this example, a discussion 510 is occurring between a user of the first participant device 502 and a user of the second participant device 506, where the user of the first participant device 502 is speaking. In this example, there may be additional participants in the conference that are not shown in FIG. 5 for simplicity and clarity. The server 504 is configured to monitor an audio channel used by the participant devices of the conference including those participant devices not shown in FIG. 5. The audio signals from each participant device may include metadata that can be used to identify the participant. The metadata may include a participant account, a participant ID, a caller ID associated with the participant device, or any other data that can be used to identify the participant.

The server 504 may detect speech in the audio signals and convert the detected speech to text data to generate a real-time transcription, for example, using an ASR process, which may include performing speech detection, audio channel processing, software-based audio analysis and processing, other audio processing, or a combination thereof. In some cases, a preset buffer delay may be used by the ASR process. The server 504 may process the text data using an ML model trained for contextual awareness to detect a name 512. For example, the ML model may detect the name 512 by keyword processing that references one or more subjects associated with the name. The one or more subjects may be based on an invitee list for the conference, a participant list for the conference, a plan for the conference, learned from previous conference plans, or any combination thereof. In another example, the ML model may detect a phrase spoken by one or more participants requesting another participant for a comment (e.g., "I would love to hear Blake's thoughts on this" and permutations thereof). In this case, the ML model may detect the name 512 based on a determination of keywords within a neighboring word range of that phrase (e.g., within ten words of the phrase in the text data).

In response to detecting the name, the server 504 transmits a request 514 to the user system 508. The request 514 may be a request to access a contact list stored in a database of the user system 508, such as the contact list database 416 shown in FIG. 4. The request 514 may include a request to access connection strength scores stored in a database of the user system 508, such as the connection strength score database 418 shown in FIG. 4. In some examples, the server 504 may transmit a separate request (not shown) to access the connection strength scores. The request 514 may indicate the detected name, one or more permutations of the detected name, the user of the first participant device 502 (i.e., the speaker), the users of other conference participant devices, or any combination thereof. The user system 508 transmits contact data 516 of one or more participants associated with the participants indicated in the request 514 in the form of a contact list to the server 504. The contact data 516 may include connection strength scores between the user of the first conference participant device 502 and individual persons indicated in the contact data 516. In some examples, the user system 508 may transmit the connection strength scores separately from the contact data 516. The server 504 receives the contact data 516 and determines 518 a list of person candidates. The list of person candidates may be determined based on scores for individual persons in the contact data 516 relative to the detected name.

The server 504 determines an intended person 520 referred to by the user of the first participant device 502 from the list of person candidates. The determination of the intended person may be based on the connection strength score between the user of the first participant device 502 and a person in the list of person candidates, a context of what was spoken, or both. In an example, determining the intended person may include determining a respective connection strength score for each person of the list of person candidates. In this example, the context of what was spoken is determined and the intended person is determined based on the connection strength scores fore each person of the list of person candidates and the context of what was spoken. In another example, determining the intended person may include determining whether the connection strength score meets a threshold (e.g., a connection strength score of 80 when the connection strength score is based on a scale from 0 to 100). In this example, a person can be added to a second list of person candidates when the connection strength score meets the threshold. The server 504 then selects a candidate name with the highest connection strength score from the second list of person candidates.

The server 504 may transmit a prompt 522 to the first participant device 502 for display on a display of the first participant device 502. The prompt 522 may be displayed as a pop-up window, displayed in a chat room as a private message, or sent as an email or another type of communication. The prompt 522 may be a confirmation request to request confirmation of whether the determined intended person is the correct person referred to by the conference participant. The first participant device 502 may obtain an input from the conference participant in response to the prompt 522 and transmit a response message 524 indicating whether the determined intended person is correct. If the determined intended person is not correct, the server 504 continues to determine the intended person 520 until the correct intended person is determined. The input may be a touch input, a keyboard input, a mouse input, or another input.

The server 504 generates a transcript 526. The transcript includes a name of the intended person. The server 504 may embed a hyperlink to the name of the intended person in the transcript. The hyperlink may be associated with a profile card of the person associated with the name. The server 504 transmits the transcript 528 to the first participant device 502, the second participant device 506, or another participant device that is not shown. The transcript 528 is viewable on displays of the first participant device 502, the second participant device 506, and other participant devices not shown.

Figure 6:
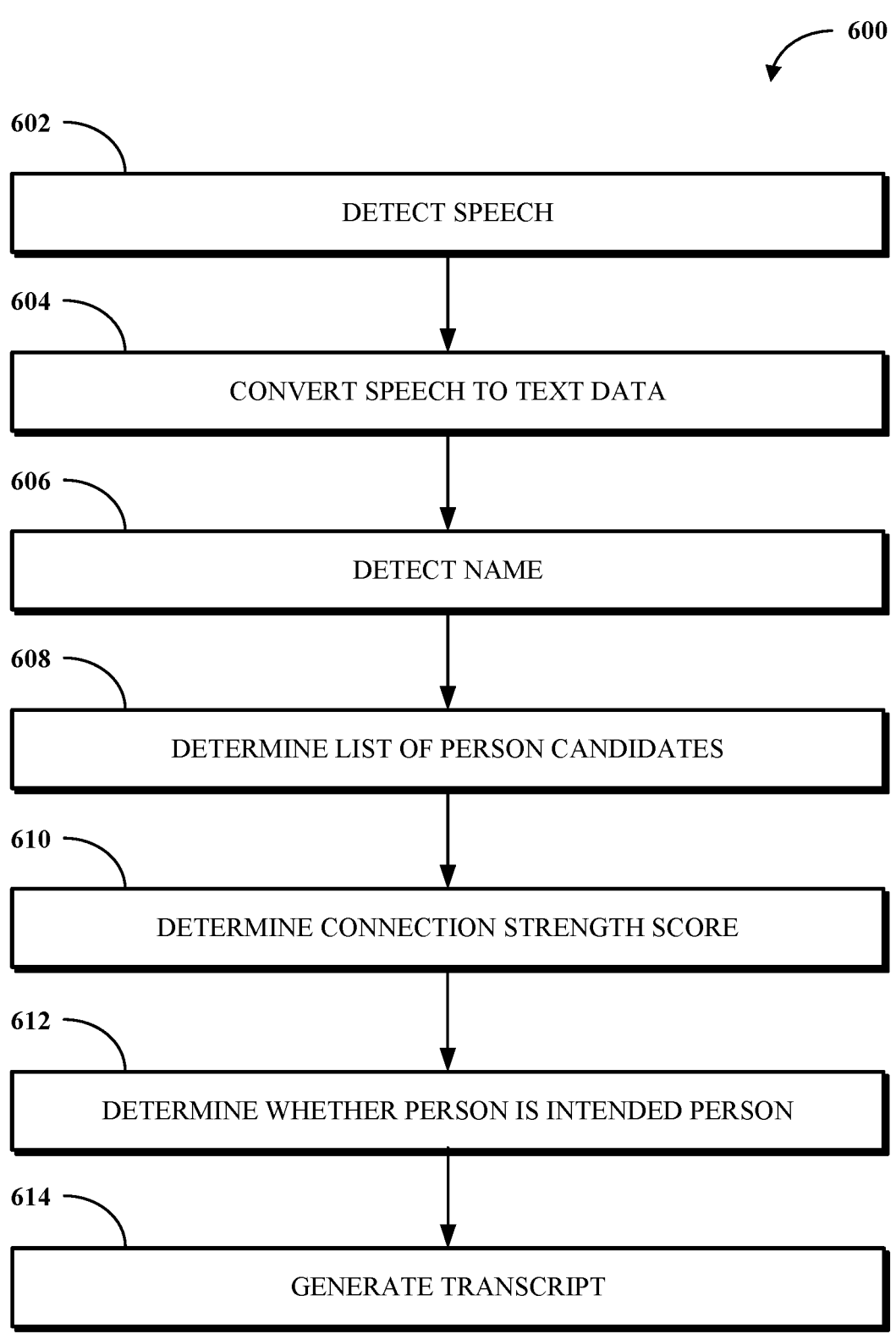
FIG. 6 is a flowchart of an example of a method for name detection and attribution during a conference.
Figure 7:
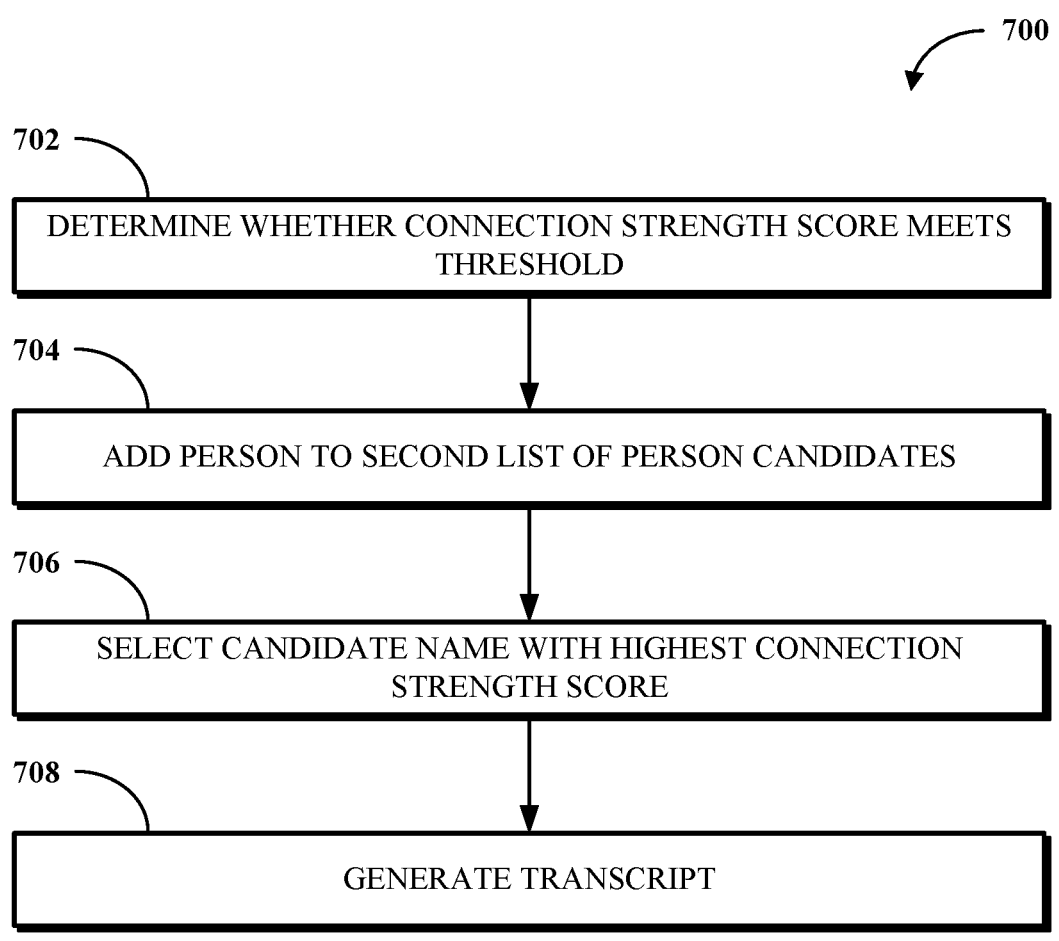
FIG. 7 is a flowchart of an example of a method for determining an intended person to whom a speaker was referring during a conference.
Figure 8:
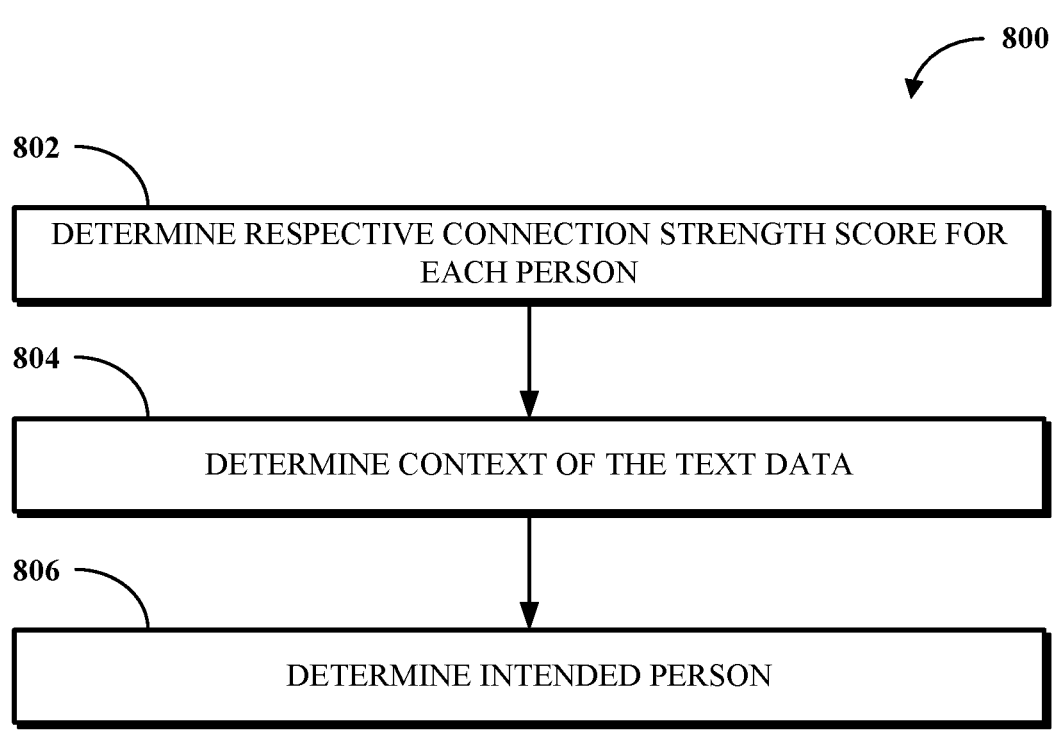
FIG. 8 is a flowchart of an example of another method for determining an intended person to whom a speaker was referring during a conference.

To further describe some implementations in greater detail, reference is next made to examples of techniques which may be performed by or using a system for name detection and attribution in conferences. FIGS. 6-8 are flowcharts of examples of methods for name detection and attribution in conferences. The methods 600, 700, and 800 can be executed using computing devices, such as the systems, hardware, and software described with respect to FIGS. 1-5. The methods 600, 700, and 800 can be performed, for example, by executing a machine-readable program or other computer-executable instructions, such as routines, instructions, programs, or other code. The steps, or operations, of the methods 600, 700, and 800 or another technique, method, process, or algorithm described in connection with the implementations disclosed herein can be implemented directly in hardware, firmware, software executed by hardware, circuitry, or a combination thereof.

For simplicity of explanation, the methods 600, 700, and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flowchart of an example of a method 600 for name detection and attribution during a conference. At 602, the method 600 includes detecting speech. The speech is detected from a conference participant within an audio stream of a conference. For example, an ASR process can detect the speech within the audio stream once the audio stream has been obtained at a server used for the conference. The conference participant may be associated with an organization or otherwise associated with a shared account. In some examples, the conference participant may not be associated with the organization or a shared account. At 604, the method 600 includes converting the speech to text data.

At 606, the method 600 includes detecting a name in the text data. In an example, the name may lack a match in a contact list associated with persons in the organization, such as when the name is mispronounced by the conference participant, the name is a nickname instead of a proper name, or there are multiple users within the organization or on the account with the same (or similar) name.

At 608, the method 600 includes determining a list of person candidates from the contact list. The list of person candidates includes one or more persons associated with the name based on scores determined for each individual person in the contact list relative to the name. The list of person candidates may include one or more persons associated with one or more permutations of the name.

At 610, the method 600 includes determining a connection strength score between the conference participant and a person in the list of person candidates. The connection strength score is determined based on a number of interactions between the conference participant and a person in the list of person candidates. The connection strength score increases as the number of interactions between the conference participant and the person in the list of person candidates increases. In some examples, the connection strength score may be based on a recency score of one or more interactions between the conference participant and the person in the list of person candidates. The more recent the interaction between the conference participant and the person in the list of person candidates, the higher the recency score, and thus, the higher the connection strength score. In some examples, the connection strength score may be based on a number of common interactions of the conference participant that spoke the name and the person in the list of person candidates.

At 612, the method 600 includes determining whether a person in the list of person candidates is an intended person referred to by the conference participant. The determination of whether the person in the list of person candidates is the intended person referred to by the conference participant is based on the connection score, a context of the text data, or both. For example, the system may determine that the person is the intended person referred to by the conference participant when the connection score meets or exceeds a threshold. In an example where the context of the text data is used to determine that the person referred to by the conference participant is the intended person, the system may determine that the context of the text data references a common document, application, or event that is shared between the conference participant and the intended person.

At 614, the method 600 includes generating a transcript. In some examples, the transcript may be generated and displayed in real-time during the conference. The transcript is generated based on the text data and includes the name of the intended person. The name of the intended person in the transcript may include an embedded hyperlink. The embedded hyperlink may be associated with a profile card of the person associated with the name of the intended person. Accessing the embedded hyperlink in the transcript causes the profile card of the person associated with the name of the intended person to be displayed on a display of a conference participant device. In some examples, after the conclusion of the conference, the transcript may be accessed by a device of a conference participant and/or a device of a user who did not attend the conference.

FIG. 7 is a flowchart of an example of a method 700 for determining an intended person to whom a speaker was referring during a conference. At 702, the method 700 includes determining whether a connection strength score determined at 610 in FIG. 6 meets a threshold. The connection strength score is based on a number of interactions between a conference participant and a person in a list of person candidates. In an example, the connection strength score may be based on a scale from 0 to 100, and the threshold may be 60.

At 704, the method 700 includes adding a person to a second list of person candidates when the connection strength score meets the threshold. The second list of person candidates is a subset of persons from the list of person candidates determined at 608 in FIG. 6 who meet or exceed the threshold. In an example where the threshold is 60, each person in the list of person candidates determined at 608 in FIG. 6 that has a connection strength score of at least 60 is added to the second list of person candidates.

At 706, the method 700 includes selecting a candidate name with the highest connection strength score from the second list of person candidates. The selected candidate name is deemed to be the name of the intended person to whom the speaker was referring during the conference.

At 708, the method 700 includes generating a transcript. In some examples, the transcript may be generated and displayed in real-time during the conference. The transcript is generated based on text data associated with speech detected in the conference and includes the name of the selected candidate name. The name of the selected candidate in the transcript may include an embedded hyperlink. The embedded hyperlink may be associated with a profile card of the person associated with the name of the selected candidate.

FIG. 8 is a flowchart of an example of another method 800 for determining an intended person to whom a speaker was referring during a conference. At 802, the method 800 includes determining a respective connection strength score for each person of the list of person candidates determined at 608 in FIG. 6. The connection strength score determined at 610 in FIG. 6 is based on a number of interactions between a conference participant and a person in a list of person candidates. The connection strength score for a person can be updated and stored each time the person has an interaction with the conference participant.

At 804, the method 800 includes determining the context of text data associated with speech detected in the conference. For example, an ML model may use keyword processing that references one or more subjects associated with a person in the list of person candidates to determine the context of the text data. The one or more subjects may be based on an invitee list for the conference, a participant list for the conference, a plan for the conference, learned from previous conference plans, or any combination thereof. The ML model may detect a phrase spoken by the conference participant and determine the context of the text data based on a keyword within a neighboring word range of that phrase (e.g., within five words of the phrase in the text data).

At 806, the method 800 includes determining the intended person. The intended person is determined based on the connection strength scores for each person and the context of the text data. For example, the context may refer to a chat message exchange in which the conference participant that spoke the name and the person in the list of person candidates participated. If the connection strength score between the conference participant that spoke the name and the person in the list of person candidates is above a threshold, the context of the text data may be used to infer that the person in the list of person candidates is the intended person.

An aspect may include a method that includes detecting speech from a conference participant within an audio stream of a conference. The conference participant may be associated with an organization. The method may include converting the speech to text data. The method may include detecting a name in the text data. The name may lack a match in a contact list associated with persons in the organization. The method may include determining, from the contact list, a list of person candidates associated with the name based on scores determined for individual persons in the contact list relative to the name. The method may include determining a connection strength score between the conference participant and a person in the list of person candidates. The method may include determining, based on the connection strength score, that the person is an intended person referred to by the conference participant. The method may include generating a transcript of the conference based on the text data. The transcript may include a name of the intended person.

In an aspect, a server may include one or more processors configured to detect speech from a conference participant within an audio stream of a conference, wherein the conference participant is associated with an organization. The one or more processors may be configured to convert the speech to text data. The one or more processors may be configured to detect a name in the text data, wherein the name lacks a match in a contact list associated with persons in the organization. The one or more processors may be configured to determine, from the contact list, a list of person candidates associated with the name based on scores determined for individual persons in the contact list relative to the name. The one or more processors may be configured to determine a connection strength score between the conference participant and a person in the list of person candidates. The one or more processors may be configured to determine, based on the connection strength score, that the person is an intended person referred to by the conference participant. The one or more processors may be configured to generate a transcript of the conference based on the text data, wherein the transcript includes a name of the intended person. In an aspect, a non-transitory computer-readable medium may include instructions stored on a memory, that when executed by a processor, cause the processor to perform operations. The operations may include detecting speech from a conference participant within an audio stream of a conference, wherein the conference participant is associated with an organization. The operations may include converting the speech to text data. The operations may include detecting a name in the text data, wherein the name lacks a match in a contact list associated with persons in the organization. The operations may include determining, from the contact list, a list of person candidates associated with the name based on scores determined for individual persons in the contact list relative to the name. The operations may include determining a connection strength score between the conference participant and a person in the list of person candidates. The operations may include determining, based on the connection strength score, that the person is an intended person referred to by the conference participant. The operations may include generating a transcript of the conference based on the text data, wherein the transcript includes a name of the intended person.

In one or more aspects, a determination may be made as to whether the connection strength score meets a threshold. In one or more aspects, the person may be added to a second list of person candidates when the connection strength score meets the threshold. In one or more aspects, a candidate name with a highest connection strength score may be selected from the second list of person candidates. In one or more aspects, the transcript may be generated such that it includes the candidate name. In one or more aspects, a confirmation request may be transmitted to a user device of the conference participant. The confirmation request may be a pop-up notification requesting a confirmation of the name, a chat room notification requesting a confirmation of the name, or an email notification requesting a confirmation of the name. In one or more aspects, a response that indicates that the name is confirmed may be received. In one or more aspects, a hyperlink to the name may be embedded in the transcript, wherein the hyperlink is associated with a profile card of the person associated with the name. In one or more aspects, the connection strength score may be based on a number of interactions between the person and the conference participant. In one or more aspects, the connection strength score may be based on a recency score of one or more interactions between the person and the conference participant. In one or more aspects, determining the intended person may include using an ML model trained for contextual awareness. In one or more aspects, a respective connection strength score for each person of the list of person candidates may be determined. In one or more aspects, a context of the text data may be determined. In one or more aspects, the intended person may be determined based on the connection strength scores for each person and the context. In one or more aspects, the connection strength score may be based on a number of common interactions of the person and the conference participant, wherein a common interaction is based on activity of the person associated with the name and activity of the conference participant with a common application. In one or more aspects, the contact list may include conference participants that are not associated with the organization. In one or more aspects, the name may be detected by a keyword that references one or more subjects. In one or more aspects, the name may be detected based on a determination of keywords within a neighboring word range of a detected phrase. In one or more aspects, the text data may be processed by an ML model trained for contextual awareness.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
detecting, by a server comprising one or more processors configured to execute non-transitory computer-readable instructions, speech from a conference participant within an audio stream of a conference, wherein the conference participant is associated with an organization;
converting, by the server, the speech to text data;
detecting, by the server, a name in the text data, wherein the name lacks a match in a contact list associated with persons in the organization;
determining, by the server, from the contact list, a list of person candidates associated with the name based on scores determined for individual persons in the contact list relative to the name;
determining, by the server, a connection strength score between the conference participant and a person in the list of person candidates;
determining, by the server, based on the connection strength score, that the person is an intended person referred to by the conference participant; and
generating, by the server, a transcript of the conference based on the text data, wherein the transcript includes a name of the intended person;
wherein the connection strength score is computed by a machine learning model trained on historical conference data to associate speech patterns with conference participants and the transcript includes an embedded hyperlink to a dynamically generated profile card for the intended person, the profile card being retrieved from a remote server in response to selection of the hyperlink.

2. The method of claim 1, further comprising:
determining whether the connection strength score meets a threshold;
adding the person to a second list of person candidates when the connection strength score meets the threshold;
selecting a candidate name with a highest connection strength score from the second list of person candidates; and
generating the transcript, wherein the transcript includes the candidate name.

3. The method of claim 1, further comprising:
transmitting a confirmation request to a user device of the conference participant, wherein the confirmation request is a pop-up notification requesting a confirmation of the name.

4. The method of claim 1, further comprising:
transmitting a confirmation request to a user device of the conference participant, wherein the confirmation request is a pop-up notification requesting a confirmation of the name; and
receiving a response that indicates that the name is confirmed.

5. The method of claim 1, further comprising:

embedding a hyperlink to the name in the transcript, wherein the hyperlink is associated with a profile card of the person associated with the name.

6. The method of claim 1, wherein the connection strength score is based on a number of interactions between the person and the conference participant.

7. The method of claim 1, wherein the connection strength score is based on a recency score of one or more interactions between the person and the conference participant.

8. The method of claim 1, wherein the machine learning model is trained for contextual awareness.

9. A server comprising:

one or more processors configured execute non-transitory computer-readable instructions to:

detect speech from a conference participant within an audio stream of a conference, wherein the conference participant is associated with an organization;

convert the speech to text data;

detect a name in the text data, wherein the name lacks a match in a contact list associated with persons in the organization;

determine, from the contact list, a list of person candidates associated with the name based on scores determined for individual persons in the contact list relative to the name;

determine a connection strength score between the conference participant and a person in the list of person candidates;

determine, based on the connection strength score, that the person is an intended person referred to by the conference participant; and generate a transcript of the conference based on the text data, wherein the transcript includes a name of the intended person;

wherein the connection strength score is computed by a machine learning model trained on historical conference data to associate speech patterns with conference participants and the transcript includes an embedded hyperlink to a dynamically generated profile card for the intended person, the profile card being retrieved from a remote server in response to selection of the hyperlink.

10. The server of claim 9, wherein the one or more processors are further configured to:

determine a respective connection strength score for each person of the list of person candidates;

determine a context of the text data; and determine the intended person based on the connection strength scores for each person and the context.

11. The server of claim 9, wherein the one or more processors are further configured to:

transmit a confirmation request to a user device of the conference participant, wherein the confirmation request is a chat room notification requesting a confirmation of the name.

12. The server of claim 9, wherein the one or more processors are further configured to:

transmit a confirmation request to a user device of the conference participant, wherein the confirmation request is a chat room notification requesting a confirmation of the name; and receiving a response that indicates that the name is confirmed.

13. The server of claim 9, wherein the connection strength score is based on a number of common interactions of the person and the conference participant, wherein a common interaction is based on activity of the person associated with the name and activity of the conference participant with a common application.

14. The server of claim 9, wherein the contact list includes conference participants not associated with the organization.

15. A non-transitory computer-readable medium comprising instructions stored on a memory, that when executed by a processor, cause the processor to perform operations comprising:

detecting speech from a conference participant within an audio stream of a conference, wherein the conference participant is associated with an organization;

converting the speech to text data;

detecting a name in the text data, wherein the name lacks a match in a contact list associated with persons in the organization;

determining, from the contact list, a list of person candidates associated with the name based on scores determined for individual persons in the contact list relative to the name;

determining a connection strength score between the conference participant and a person in the list of person candidates;

determining, based on the connection strength score, that the person is an intended person referred to by the conference participant; and generating a transcript of the conference based on the text data, wherein the transcript includes a name of the intended person;

wherein the connection strength score is computed by a machine learning model trained on historical conference data to associate speech patterns with conference participants and the transcript includes an embedded hyperlink to a dynamically generated profile card for the intended person, the profile card being retrieved from a remote server in response to selection of the hyperlink.

16. The non-transitory computer-readable medium of claim 15, wherein the instructions, when executed by the processor, cause the processor to perform operations comprising:

detecting the name by a keyword that references one or more subjects.

17. The non-transitory computer-readable medium of claim 15, wherein the instructions, when executed by the processor, cause the processor to perform operations comprising:

detecting the name based on a determination of keywords within a neighboring word range of a detected phrase.

18. The non-transitory computer-readable medium of claim 15, wherein the instructions, when executed by the processor, cause the processor to perform operations comprising:

transmitting a confirmation request to a user device of the conference participant, wherein the confirmation request is an email notification requesting a confirmation of the name.

19. The non-transitory computer-readable medium of claim 15, wherein the instructions, when executed by the processor, cause the processor to perform operations comprising:

transmitting a confirmation request to a user device of the conference participant, wherein the confirmation request is an email notification requesting a confirmation of the name; and receiving a response that indicates that the name is confirmed.

20. The non-transitory computer-readable medium of claim 15, wherein the machine learning model is trained for contextual awareness.

* * * * *